United States Patent Office 3,316,389
Patented Apr. 25, 1967

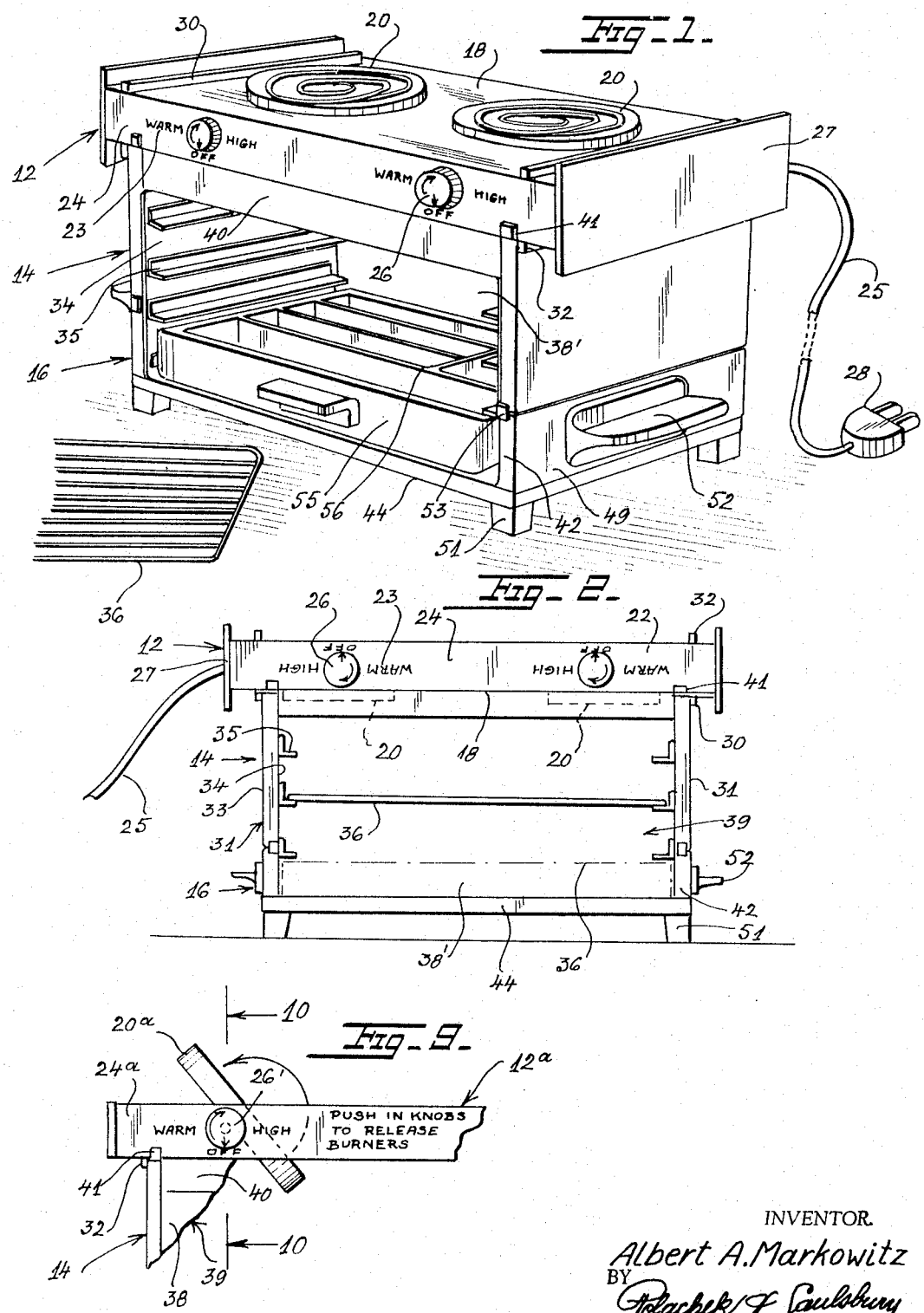

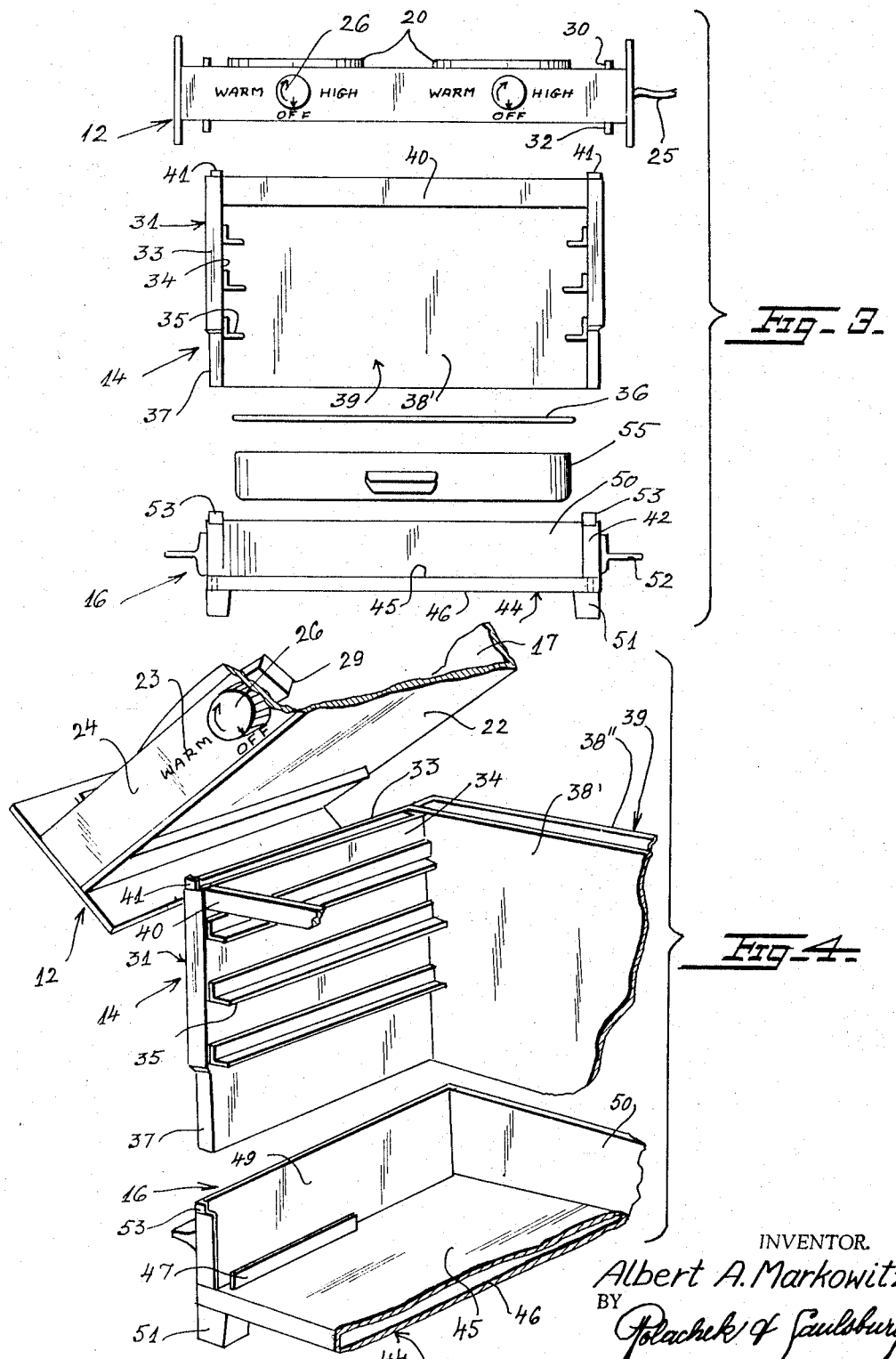

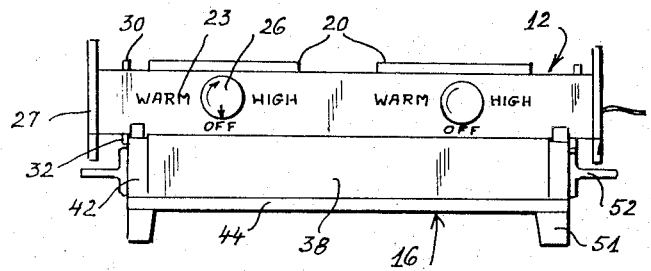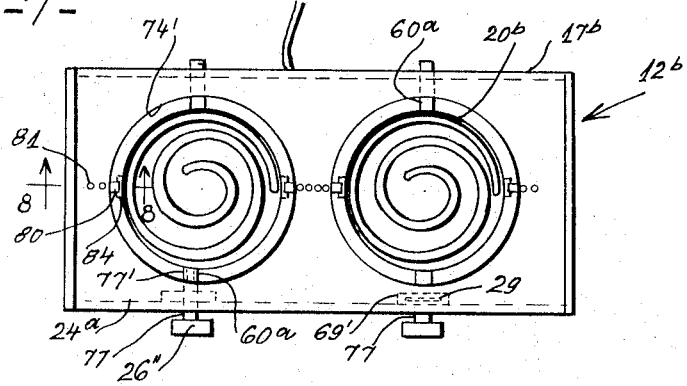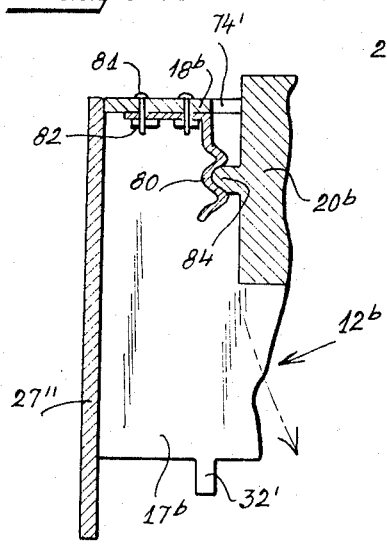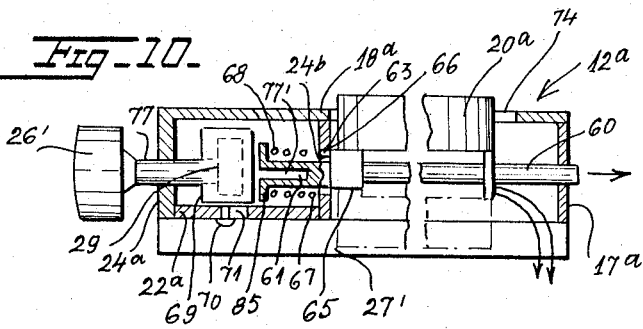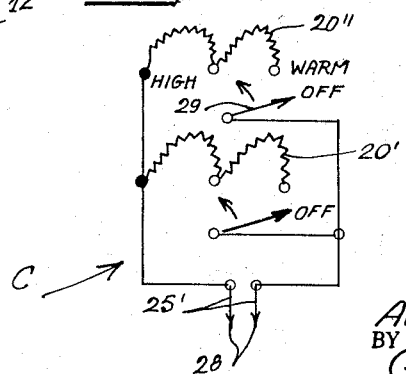

3,316,389
COMBINATION ELECTRIC BROILER AND ELECTRIC STOVE
Albert A. Markowitz, 1632 Meridian Ave., Miami Beach, Fla. 33139
Filed June 8, 1964, Ser. No. 373,475
6 Claims. (Cl. 219—454)

This invention concerns a combination electric broiler and electric stove.

According to the invention there is provided an appliance including an electric cooking unit having a pair of electric burners. A stand is provided upon which the cooking unit can be mounted in an upright position with burners uppermost for cooking purposes. The cooking unit can be turned upside down on the stand to serve as a broiler unit for food inside the stand. The appliance further includes a base for the stand or cooking unit. The stand is arranged with lateral rails for supporting a broiler rack. The base has a compartment to receive a cutlery tray or to store food.

The appliance avoids the difficulties and disadvantages encountered in prior appliances of this type in being easily set up and disassembled. It has a modular construction so that parts can be inverted or omitted. Complicated mechanisms, hinges or intricate holding devices are avoided. It is readily taken apart for cleaning inside and out. The several parts can be made of stainless steel which is non-corrosive, easily sterilized, strong, durable, light in weight, and attractive in appearance. In a modification of the invention, burners in the cooking burner unit can be inverted.

It is therefore a principal object of the invention to provide a combination broiler and electric stove having readily separable parts which can be inverted or used separately.

Another object is to provide a cooking appliance including an electric burner unit, a stand and base, all detachable from each other and readily taken apart for cleaning inside and out.

A further object is to provide a cooking appliance of the character described, with rotatable burners.

For further comprehension of the invention and of the objects and advantages thereof, referenec will be had to the following description and accompanying drawings, and to the appended claims in which the various novel features of the invention are more particularly set forth.

In the accompanying drawings forming a material part of this disclosure:

FIG. 1 is a perspective view of a broiling and cooking appliance embodying the invention.

FIG. 2 is a front elevational view of the appliance, with cutlery tray removed.

FIG. 3 is an exploded front view of parts of the appliance.

FIG. 4 is a fragmentary, exploded perspective view of parts of the appliance.

FIG. 5 is a front elevational view of an assembly of parts of the appliance.

FIG. 6 is a diagram of the electric circuit of the appliance.

FIG. 7 is a top plan view of another broiler and cooking unit according to the invention.

FIG. 8 is an enlarged fragmentary sectional view taken on line 8–8 of FIG. 7.

FIG. 9 is a front elevational view of part of another cooking unit, parts being shown broken away.

FIG. 10 is an enlarged fragmentary sectional view taken on line 10–10 of FIG. 9, parts being shown broken away.

Referring first to FIGS. 1–5, there is shown an appliance including a rectangular cooking unit 12, stand 14, and base 16 superimposed one on the other. The cooking unit 12 includes a closed casing having a flat top plate 18 on which are secured two spaced circular electric burners 20. The casing has a closed bottom plate 22 and rear wall 17. On front wall 24 of the casing is a pair of knobs 26 which control switches 29 in the casing for adjusting the heat setting of the burners. The heat setting is indicated by indicia 23 on wall 24. The electrical resistance elements of the burners are connected in circuit with the switches 29 and with a power cord 25 terminating in a plug 28 which can be inserted into a suitable power outlet.

The side walls 27 of the casing extend upwardly beyond the top plate 18 and bottom plate 22 to serve as legs when the unit 12 is standing alone right side up or upside down. Laterally spaced from the side walls are ridges 30, 32 on top and bottom plates respectively to anchor the unit 12 on stand 14.

The stand 14 is a rectangular U-shaped frame structure with open front, top and bottom. The stand has opposite sides 31, each formed with double walls 33, 34; see FIG. 4. On the inner walls 34 are parallel angle brackets 35 serving as rails on which a broiler rack 36 can be disposed. The forward edges 37 of the side walls at the bottom are recessed to slide into the base 16. The stand has a back 39 formed by two spaced walls 38', 38". A cross bar 40 joins the sides 31 at the top of the stand. The horizontal length of the stand is equal to the distance between inner sides of ridges 30, 32 so that these ridges will be located at the outer side walls of the stand as clearly shown in FIGS. 1 and 2. This prevents the cooking uint from turning on the stand. Flanges 41 at upper ends of the front edges of the stand engage the front wall 24 and prevent the unit 12 from sliding forwardly off the stand.

The bottom recessed edges 37 of the stand fit in behind front flanges 42 of the base 16. The base is a box-like structure. It has a closed bottom 44 formed with double spaced walls 45, 46. Guide flanges 47 extend upwardly from wall 45 near side walls 49 of the base. The side walls 49 and bottom 44 are joined by a back wall 50. Four legs 51 are secured to the bottom wall 45 at its corners. Laterally extending flanges 52 secured to side walls 49 serve as handles. Outwardly and upwardly bent flange 53 at upper ends of flanges 42 serve as stop elements to keep the unit 12 from sliding forwardly on base 16.

A rectangular cutlery tray 55 with vertical partitions 56 and open top can be inserted into the compartment defined by the balls of the base.

FIG. 1 shows the assembled appliance with unit 12 mounted on the stand 14 which in turn is fitted to the base 16. Pots, pans or other cooking utensils can be placed on the burners 20 while the assembly serves as a stove. The cutlery tray 55 is in the base 16. The broiler rack 36 is shown outside the assembly in FIG. 1.

In FIG. 2 the unit 12 is inverted. The burners 20 face downwardly into the stand to serve as a broiler for food placed on the broiler rack 36. The cutlery tray has been removed but is shown by dotted lines.

FIG. 3 and FIG. 4 illustrate the manner of assembly of the units and parts together. The double wall construction of the sides, back, bottom and top of the assembly has dead air spaces between the walls which provide thermal insulation. Thus the assembly of FIG. 2 serves as an efficient broiling appliance and waste of heat is minimized.

In FIG. 6 is shown the electric circuit C of the appliance. The resistance heater elements 20', 20" of the circuit are connected to switches 29 which are controllable independently of each other. They are connected in parallel to power cord 25' which terminates in plug 28.

FIG. 5 shows cooking unit 12 mounted on the base 16, for use as a table-top stove. The unit could be inverted for use as a table-top broiler.

In FIGS. 9 and 10 are shown parts of another electric cooking unit 12a. This unit has each of its burners 20a secured on a shaft 60. The shaft is rotatably journaled in a forward partition 24b spaced rearwardly from front wall 24a. The burner is secured to the shaft by a block 65 having a forwardly extending finger 63 which can be inserted into an upper hole 66 or a lower hole 67 in partition 24b. A coil spring 68 on shaft 60 bears against partition 24b and a flange 85 on shaft 60. The spring urges the entire assembly of shaft and burner forwardly. The forward end of the shaft 70 has a blind bore 61 which receives a rear extension 77' of shaft 77 which operates switch 29 in housing 69. Knob 26' is mounted on the forward end of shaft 77. The knob 26' and shaft 77 can be turned to operate the switch. The switch housing is held non-rotatably by a pin 70 passing through a slot 71 in bottom plate 22a. When the shaft 77 and knob 26' are pushed rearwardly, the switch housing moves with it while pin 70 remains engaged in slot 71. This movement pushes shaft 60 axially rearwardly and disengages finger 63 of block 65 from hole 66 or 67. Then the burner 20a can be manually turned to face upwardly or can be turned 180° to face downwardly. When the knob 26' is released the finger 63 will engage in either hole 66 or 67 so that the burner is stationary while the shaft 77 and knob 26' can be rotated to operate switch 29 in housing 69.

In FIGS. 7 and 8 is shown another cooking unit 12b in which each of the burners 20b is rotatably mounted in opening 74' in top 18b. The burners rotate with shafts 60a. Knobs 26" on shafts 77 are used in setting switches 29 in housing 69'. Leaf springs 80 are secured by bolts 81 and nuts 82 to the top 18b. The burners have laterally projecting lugs 84 which engage in recesses formed in the leaf springs when the burners are horizontal. Switch housings 69' on the shafts 77 are held non-rotatably at front wall 24a'. Thus the switches can be operated by turning knobs 26". Shaft extensions 77' are disposed in axial bores in shafts 60a and permit the shafts 60a to rotate independently of shafts 77. The burners 20b can be turned manually by forcing them free of springs 80 without pushing in knobs 26" as is required in unit 12a. When the burners are facing upwardly the unit 12b can be used like a stove to support cooking utensils. When the burners are turned 180° to face downwardly the unit can be used like a broiler. Side walls 27' of unit 12a and side walls 27" of unit 12b extend below the front and rear walls to serve as legs. Depending lugs 32' engage at sides of stand 14 or base 16 to prevent lateral sliding movements of the units on the stand or base.

The units 12, 12a and 12b can stand on their own legs away from the stand and base or can be supported on either the stand or base for use as cooking or broiling cookers or broilers. It will be noted that several parts of the appliance are readily detachable from each other and can be easily cleaned. It is preferred that the parts be made of stainless steel insofar as possible to insure durability, light weight and attractive appearance.

While I have illustrated and described the preferred embodiments of my invention, it is to be understood that I do not limit myself to the precise constructions herein disclosed and that various changes and modifications may be made with the scope of the invention as defined in the appended claims.

Having thus described my invention, what I claim as new, and desire to secure by United States Letters Patent is:

1. A combination cooking appliance, comprising a cooking unit having a horizontal flat top, a flat horizontal bottom spaced from the top, vertical front and rear walls, and side walls joined to the top, bottom, front and rear walls, said side walls having free ends extending above and below said top and bottom to serve as legs for the unit, electric burner elements mounted on the flat top, and switches operable by knobs on the front wall, said switches being connected in circuit with said burner elements; a stand in the form of a rectangular U-shaped structure having an open top, bottom and front, said structure having side and rear walls joined together to support detachably said cooking unit, flanges on the side walls of the stand to prevent the cooking unit from sliding forwardly off the stand, and projections on the top and bottom of the cooking unit to engage side walls of the stand to prevent the unit from sliding laterally on the stand; and a box-like base with closed horizontal bottom, vertical sides and vertical rear wall joined to the bottom of the base, said base having an open top and front, whereby said stand can be detachably mounted on the base to define with the base and the cooking unit a large broiler compartment, the cooking unit being invertible over the stand so that the burner elements face downwardly into said compartment.

2. A combination cooking appliance, comprising a cooking unit having a horizontal flat top, a flat horizontal bottom spaced from the top, vertical front and rear walls, and side walls joined to the top, bottom, front and rear walls, said side walls having free ends extending above and below said top and bottom to serve as legs for the unit, electric burner elements mounted on the flat top, and switches operable by knobs on the front wall, said switches being connected in circuit with said burner elements; a stand in the form of a rectangular U-shaped structure having an open top, bottom and front, said structure having side and rear walls joined together to support detachably said cooking unit, flanges on the side walls of the stand to prevent the cooking unit from sliding forwardly off the stand, and projections on the top and bottom of the cooking unit to engage side walls of the stand to prevent the unit from sliding laterally on the stand; and a box-like base with closed horizontal bottom, vertical sides and vertical rear wall joined to the bottom of the base, said base having an open top and front, whereby said stand can be detachably mounted on the base to define with the base and the cooking unit a large broiler compartment, the cooking unit being invertible over the stand so that the burner elements face downwardly into said compartment, the side walls of the stand having lateral rails projecting inside the compartment to serve as suports for a broiler rack, the side and rear walls of the stand, and the bottom of the base being formed with spaced parallel plates to define thermally insulating dead air spaces therebetween, the spaced top and bottom of the cooking unit on the stand defining a further dead air space, the air spaces preventing loss of heat through walls of said compartment.

3. A combination cooking appliance, comprising a cooking unit having a horizontal flat top, a flat horizontal bottom spaced from the top, vertical front and rear walls, and side walls joined to the top, bottom, front and rear walls, said side walls having free ends extending above and below said top and bottom to serve as legs for the unit, electric burner elements mounted on the flat top, and switches operable by knobs on the front wall, said switches being connected in circuit with said burner elements; a stand in the form of a rectangular U-shaped structure having an open top, bottom and front, said structure having side and rear walls joined together to support detachably said cooking unit, flanges on the side walls of the stand to prevent the cooking unit from sliding forwardly off the stand, and projections on the top and bottom of the cooking unit to engage side walls of the stand to prevent the unit from sliding laterally on the stand; and a box-like base with closed horizontal bottom, vertical sides and vertical rear wall joined to the bottom of the base, said base having an open top and front, whereby said stand can be detachably mounted on the base to define with the base and the cooking unit a large broiler compartment, the cooking unit being invertible over the stand so that the burner elements face downwardly into said compartment, said base having a pair of vertical front flanges, said sides of the stand having recessed front portions for engaging behind the front flanges of the base, so that the stand is prevented from moving horizontally on the base.

4. A combination cooking appliance, comprising a cooking unit having a horizontal flat top, a flat horizontal bottom spaced from the top, vertical front and rear walls, and side walls joined to the top, bottom, front and rear walls, said side walls having free ends extending above and below said top and bottom to serve as legs for the unit, electric burner elements mounted on the flat top, and switches operable by knobs on the front wall, said switches being connected in circuit with said burner elements; a stand in the form of a rectangular U-shaped structure having an open top, bottom and front, said structure having side and rear walls joined together to support detachably said cooking unit, flanges on the side walls of the stand to prevent the cooking unit from sliding forwardly off the stand, and projections on the top and bottom of the cooking unit to engage side walls of the stand to prevent the unit from sliding laterally on the stand; and a box-like base with closed horizontal bottom, vertical sides and vertical rear wall joined to the bottom of the base, said base having an open top and front, whereby said stand can be detachably mounted on the base to define with the base and the cooking unit a large broiler compartment, the cooking unit being invertible over the stand so that the burner elements face downwardly into said compartment, the side walls of the stand having lateral rails projecting inside the compartment to serve as supports for a broiler rack, the side and rear walls of the stand, and the bottom of the base being formed with spaced parallel plates to define thermally insulating dead air spaces therebetween, the spaced top and bottom of the cooking unit on the stand defining a further dead air space, the air spaces preventing loss of heat through walls of said compartment, said base having a pair of vertical front flanges, said sides of the stand having recessed front portions for engaging behind the front flanges of the base, so that the stand is prevented from moving horizontally on the base.

5. A combination cooking appliance, comprising a cooking unit having a horizontal flat top, a flat horizontal bottom spaced from the top, vertical front and rear walls, and side walls joined to the top, bottom, front and rear walls, said side walls having free ends extending above and below said top and bottom to serve as legs for the unit, electric burner elements mounted on the flat top, and switches operable by knobs on the front wall, said switches being connected in circuit with said burner elements; and a box-like base with closed horizontal bottom, vertical sides and vertical rear wall joined to the bottom of the base, said base having an open top and front, whereby the cooking unit can be detachably mounted on the base to define a stove with the burner elements facing upwardly, and whereby the cooking unit can be mounted on the base in an inverted position to define with the base a broiler compartment, with the burner elements facing into said compartment, the cooking unit having projections on the top and bottom thereof to engage at opposite sides of the base to prevent the cooking unit from sliding laterally off the base, said base having front flanges extending upwardly for engaging the front wall of the cooking unit to prevent the same from sliding forwardly off the base.

6. A combination cooking appliance, comprising a cooking unit having a horizontal flat top, a flat horizontal bottom spaced from the top, vertical front and rear walls, and side walls joined to the top, bottom, front and rear walls, said side walls having free ends extending above and below said top and bottom to serve as legs for the unit, electric burner elements mounted on the flat top, and switches operable by knobs on the front wall, said switches being connected in circuit with said burner elements; and a box-like base with closed horizontal bottom, vertical sides and vertical rear wall joined to the bottom of the base, said base having an open top and front, whereby the cooking unit can be detachably mounted on the base to define a stove with the burner elements facing upwardly, and whereby the cooking unit can be mounted on the base in an inverted position to define with the base a broiler compartment, with the burner elements facing into said compartment, the cooking unit having projections on the top and bottom thereof to engage at opposite sides of the base to prevent the cooking unit from sliding laterally off the base, said base having front flanges extending upwardly for engaging the front wall of the cooking unit to prevent the same from sliding forwardly off the base, the bottom of the base being formed with spaced parallel plates to define a first dead air space therebetween, the top and bottom of the cooking unit defining a second dead air space therebetween, the air spaces providing thermal insulation at the top and bottom of said compartment to prevent loss of heat therethrough.

References Cited by the Examiner

UNITED STATES PATENTS

| 1,246,622 | 11/1917 | Lightfoot | 219—454 X |
| 2,055,972 | 9/1936 | Fritsche | 99—340 |
| 2,417,977 | 3/1947 | French | 219—393 |
| 2,510,116 | 6/1950 | Kaplan | 219—454 |

FOREIGN PATENTS 965,392   9/1950   France.

RICHARD M. WOOD, *Primary Examiner.*

L. H. BENDER, *Assistant Examiner.*